Figure 1:
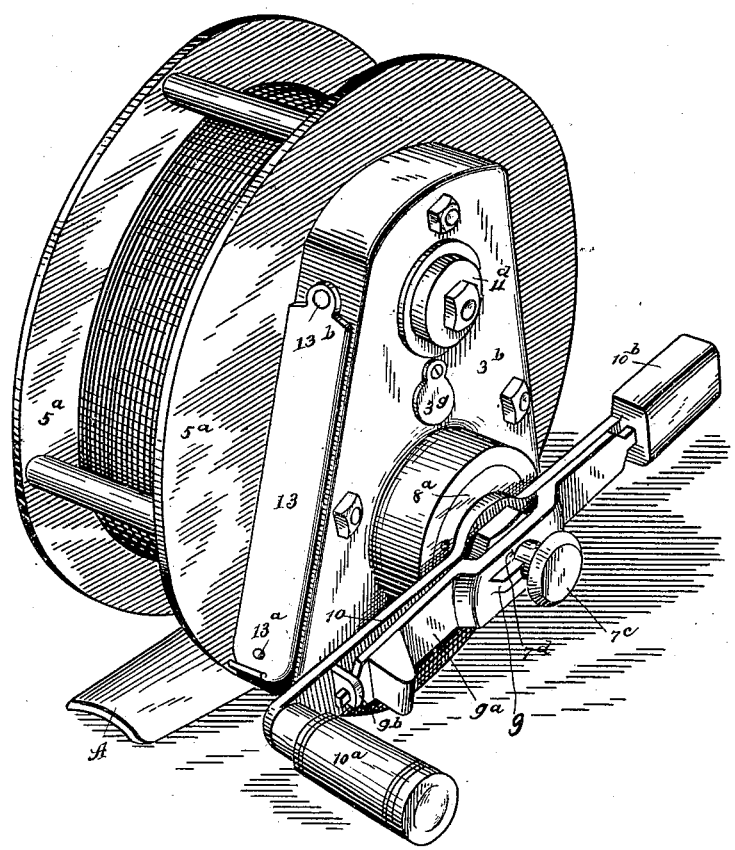

No. 627,767.  
C. H. WISNER.  
FISHING REEL.  
(Application filed Sept. 18, 1896.)

Patented June 27, 1899.

(No Model.)  
2 Sheets—Sheet 1.

WITNESSES  
INVENTOR  
Charles H. Wisner  
By Parker & Burton  
Attorneys.

No. 627,767.    Patented June 27, 1899.
C. H. WISNER.
FISHING REEL.
(Application filed Sept. 18, 1896.)
(No Model.) 2 Sheets—Sheet 2.
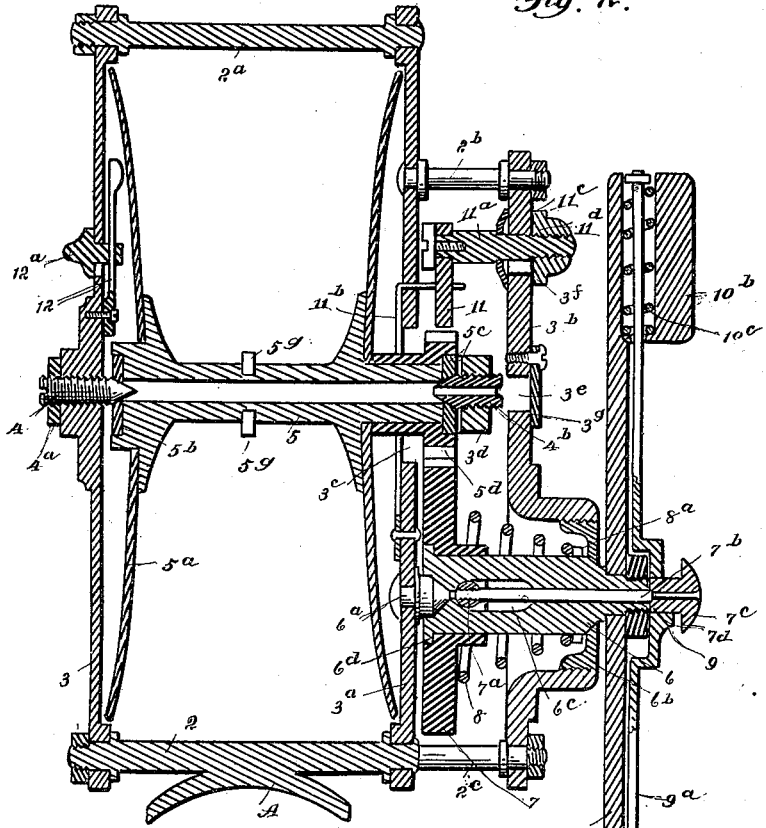
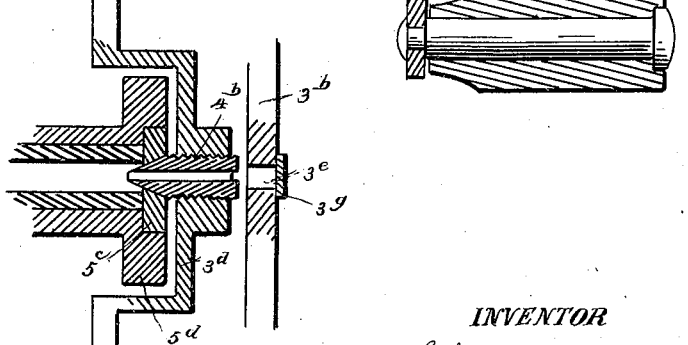
WITNESSES
D. W. Bradford
Virginia M. Clough
INVENTOR
Charles H. Wisner
By Parker & Burton
Attorneys.

UNITED STATES PATENT OFFICE.

CHARLES H. WISNER, OF FLINT, MICHIGAN.

FISHING-REEL.

SPECIFICATION forming part of Letters Patent No. 627,767, dated June 27, 1899.

Application filed September 18, 1896. Serial No. 606,217. (No model.)

*To all whom it may concern:*

Be it known that I, CHARLES H. WISNER, a citizen of the United States, residing at Flint, county of Genesee, State of Michigan, have invented a certain new and useful Improvement in Fishing-Reels; and I declare the following to be a full, clear, and exact description of the invention, such as will enable others skilled in the art to which it pertains to make and use the same, reference being had to the accompanying drawings, which form a part of this specification.

This invention relates to fishing-reels, and has for its object improvements in that class of reels which are intended to permit the greatest possible freedom of movement of the spool during the time that the line is running out in the process of "casting." For this purpose I arrange to disconnect from the spool the "drag," the "click," and the master-wheel, leaving the spool entirely free to run on the conical bearings by which it is supported.

I also provide a means of lubricating and keeping lubricated the conical bearings and of obstructing the lubricating-oil from flying off from the bearings during the time that the spool is in rapid motion when casting.

There are also other improvements in the details, which will be pointed out in the specification and claims.

In the drawings, Figure 1 shows the reel in perspective. Fig. 2 shows a cross-section taken at right angles to the base-plate and through the center of the spool. Fig. 3 shows in cross-section a portion of one of the bearings of the spool.

A indicates the base, which is of the usually-curved form, adapting it to fit the socket of any fishpole and having secured to it two of the posts 2, which tie together the side plates 3 and $3^a$, and which posts 2 and $2^a$, with the side plates 3 $3^a$, form the main frame of the reel.

On one of the side plates $3^a$ is erected a secondary frame or a housing consisting of a side plate $3^b$, securely held to the plate $3^a$ by posts $2^b$ $2^c$, and which in the finished reel is housed in or inclosed by side walls that conceal and protect the mechanism inclosed within the housing.

At the center of the plate 3 is a bearing, into which runs the cone-pointed screw 4, held in place by a jam-nut $4^a$. On the opposite plate $3^a$, over a central opening $3^c$, is a yoke $3^d$, provided with a screw-threaded opening, into which runs a cone-pointed screw $4^b$. This screw $4^b$ has a central passage-way for the introduction of oil therethrough into the hollow axle 5 of the spool $5^a$, and at each end of the hollow axle 5 are hardened bearing-plates $5^b$ $5^c$, adapted to engage the points 4 and $4^b$. On that end of the axle 5 which projects through the plate $3^a$ there is under the yoke $3^d$ a pinion $5^d$.

6 indicates a counter-shaft, one end of which engages on the conical end of a stub or post $6^a$, that is riveted or otherwise secured to the plate $3^a$. The other end of the shaft 6 projects through an adjustable bearing $6^b$ in the plate $3^b$ of the housing. As shown in the drawings, the housing is raised in the form of a neck at this bearing, and such a form is desirable, though not necessary. There is on the shaft 6 at the point where it passes through the bearing $6^b$ a conical shoulder that engages with a hollow-cone surface in the bearing $6^b$. Through the shaft 6 is an oblong hole $6^c$, and on the shaft is loosely mounted a master-wheel 7, which is held to the shaft by a pin $7^a$, that passes through the hub of the master-wheel and through the oblong hole $6^c$. The pin holds the wheel from rotation on the shaft and permits it to have a movement along the longitudinal axis of the shaft. A coiled spring 8, which bears against the master-wheel and against a collar $8^a$, always tends to throw the master-wheel toward the plate $3^a$ and into engagement with the pinion $5^d$. A collar $6^d$ on the inner end of the shaft 6 prevents the master-wheel from escaping from the shaft. Through the longitudinal axis of the shaft 6, from the longitudinal slot $6^c$ to the outer end, is a hole, and through this hole is a pin $7^b$, one end of which is secured to the pin $7^a$ and the other end of which has riveted to it a collar terminating in a knob $7^c$. At the inner end of the collar is a shoulder $7^d$, that is adapted to engage over an abutment 9 on the slide $9^a$, that lies along the crank-arm 10. The crank-arm 10 is secured to the shaft 6 and has at one end of it a winch $10^a$ and at the other end a counterweight $10^b$, within which is concealed a spring $10^c$, that surrounds the end of the slide $9^a$ and tends to draw the slide toward the weighted end of the crank-arm and holds the abutment firmly against the collar on the end of the pin $7^b$ and draws the abutment under the shoulder $7^d$ when the pin is pulled out. When so pulled out, the master-wheel is lifted out of engagement with the pinion and no longer obstructs the free revolution of the pinion and the spool. The master-wheel is moved back into engagement with the pinion by drawing the slide $9^a$ toward the winch $10^a$ until the abutment 9 is pulled from under the shoulder $7^d$, when the master-wheel instantly is forced by the spring 8 into position to engage the pinion, or if by any chance the teeth of the one catch against the teeth of the other they immediately take their proper position when the winch is moved any distance. At that end of the slide $9^a$ which is toward the winch is a guide $9^b$, consisting, preferably, of a pin riveted into the lever and provided with a hole or slot, through which extends the extreme end of the slide $9^a$.

11 indicates a click, which is a tongue of metal loosely mounted on the stem of the post $11^a$ and lying between the two upturned ends of a spring $11^b$. The spring $11^b$ holds the tongue 11 directed toward the pinion, but leaves it free to move in either direction and obstructs slightly the movement of the pinion, but does not prevent movement in either direction. The post $11^a$ projects through an elongated slot $3^f$ in the plate $3^b$, and it is held to this plate by a dished pressure-spring $11^c$ on the one side and a nut $11^d$ on the other side. The slot $3^f$ permits the click to be pushed into engagement with the pinion or pulled entirely out of engagement with it, so that on this side of the spool both the master-wheel and the click may be either engaged or disengaged from the pinion at the will of the user. On the opposite side of the spool is a drag or brake, which is also arranged to be either thrown into engagement with the spool or out of engagement with it at the will of the user. It consists of a spring 12, secured to the inner face of the plate 3, and a sliding governor $12^a$, which projects through a slot in the plate 3, terminating on its outer end by a knob, by which it may be actuated, and has at its inner end a slot, through which the spring 12 passes. The spring 12 terminates at its outer end with a shoe, and this shoe is normally pressed by the spring against the side face $5^a$ of the spool; but when the slide $12^a$ is pushed to one extremity of the slot in which it travels it lifts the shoe out of engagement with the spool and when pushed to the other extremity of the slot leaves the spring at liberty and allows the shoe to press with force against the spool.

The knob of the slide $12^a$ is squared off on its under side and is large enough to cover the slot 12 and is held by the spring of the drag into close engagement with the plate 3.

The ends of the cone-bearings 4 $4^b$ extend through the hardened bearings $5^b$ $5^c$ into the hollow shaft 5. One of these cone-bearings, preferably $4^b$, is perforated, and opposite to it there is through the plate $3^b$ an opening $3^e$, over which there is a cover-plate $3^g$, held by a single screw and so arranged that it may be shifted to one side to permit access to the passage-way through the cone, and through this passage-way a quantity of lubricating-oil may be dropped into the interior of the shaft, where it will remain, the inward-projecting points preventing it from running out, although there is no obstruction to its access to the parts that should be lubricated, and the lubricating-oil thus contained in the shaft cannot be thrown out of place by the rapid rotation of the spool.

Through the walls of the shaft of the spool project two pins $5^g$ $5^g$, or in place of the two pins a single pin may run clear through, there being two in order that the spool may be balanced, and these pins are used to attach the end of the line to.

The outer housing, which covers the driving mechanism of the spool, is entirely closed in, but is provided at one side with a swinging cover 13, that engages over a pin $13^a$ and swings on the pin $13^b$. Normally this cover is closed, but may be opened whenever it is desired for any reason to inspect the machinery within the housing.

In the shaft 6, at the bottom of the conical bearing in which the stub $6^a$ engages, is a small hole extending through into the slotted opening $6^c$, and through this small hole lubricating-oil may be introduced to lubricate the bearing, and the draw-rod $7^b$ is lubricated or can be lubricated by placing the oil for that purpose on the draw-rod in the opening $6^c$. Access to the interior of the reel is had through the hole closed by the cover 13.

What I claim is—

1. In a fishing-reel the combination of supporting-bearings, a hollow shaft, cone-points extending into the hollow of the shaft, one of said points being perforated for the admission of lubricating-oil, substantially as described.

2. In a fishing-reel in combination with a hollow spool-shaft, a longitudinally-perforated cone-bearing, a housing provided with an opening $3^e$ and a cover $3^g$ adapted to furnish access to the perforated cone-bearing, substantially as described.

3. In a fishing-reel in combination with the crank-actuated counter-shaft and master-wheel arranged to slide longitudinally thereon, a draw-pin for actuating the wheel along the shaft, a collar on said draw-pin, a slide arranged along the crank-arm and provided with an abutment adapted to engage under the collar on the draw-pin, substantially as described.

4. In combination with the master-wheel of a fishing-reel, a shaft provided at one end with a cavity adapted to receive a conical bearing-pin, and at the other with a coned shoulder and an adjustable bearing-cap adapted to engage the coned end of the shaft, substantially as described.

5. In combination with a wheel movable longitudinally along its shaft, a hollow shaft provided with a transverse oblong hole, a pin passing through the hub of the wheel and through said hole, and a draw-rod engaging the pin and adapted to actuate the wheel, substantially as described.

6. In a fishing-reel, in combination with a shaft and a wheel movable axially thereon, a draw-pin concentric with the shaft and adapted to actuate the wheel thereon, a collar on said pin, a slide held by spring tension in engagement with said collar and adapted to be drawn under said collar, substantially as described.

In testimony whereof I sign this specification in the presence of two witnesses.

CHARLES H. WISNER.

Witnesses:
   CHARLES F. BURTON,
   VIRGINIA M. CLOUGH.